June 4, 1968 A. G. WEBER 3,386,514
METHOD FOR PRODUCTION OF THIN OIL ZONES
Filed Aug. 29, 1966

ALVIN G. WEBER INVENTOR.

BY *Gary C. Honeycutt*

ATTORNEY

United States Patent Office 3,386,514
Patented June 4, 1968

3,386,514
METHOD FOR PRODUCTION OF
THIN OIL ZONES
Alvin G. Weber, Houston, Tex., assignor to Esso Production Research Company, a corporation of Delaware
Filed Aug. 29, 1966, Ser. No. 575,726
8 Claims. (Cl. 166—42)

ABSTRACT OF THE DISCLOSURE

A method of preventing or alleviating water coning in oil-producing operations wherein a viscous liquid is introduced into the producing formation through an interval extending from a point near the oil-water contact to a point substantially below the oil-water contact. The upper portion of the viscous liquid is removed by displacement with a less viscous fluid, and oil is produced by downconing into the area where the viscous liquid has been removed. The viscous liquid tends to prevent the encroachment of water into the oil producing interval.

---

This invention relates to the recovery petroleum from natural reservoirs, and particularly from oil-bearing horizons which are subject to coning from overlying gas zones and/or underlying water zones. A method is provided for increasing the recovery efficiency from such reservoirs by eliminating or minimizing the coning problem.

In accordance with one embodiment of the invention, a bank of high viscosity fluid such as thickened water or heavy oil is injected at and below the oil-water contact level of the reservoir, followed by the injection of a smaller volume of a low-viscosity fluid such as oil or brine over a more limited interval at or near the upper level of the injected bank of high-viscosity fluid. The well is then placed on production from the level at which the bank of low-viscosity fluid was injected. Because of known fluid-mobility relationships, the original reservoir oil will cone downward and be produced from a level just below the original oil-water contact. Water production is inhibited by the presence of the high-viscosity bank, although small quantities thereof may be produced with the oil.

In the event a gas zone is present above the oil zone, gas coning in reduced or prevented by the greater vertical distance between the producing interval and the gas-oil contact. Another factor tending to reduce gas-coning is that the pressure drawdown corresponding to a given production rate can be reduced by increasing the width of the producing interval.

Figure 1:
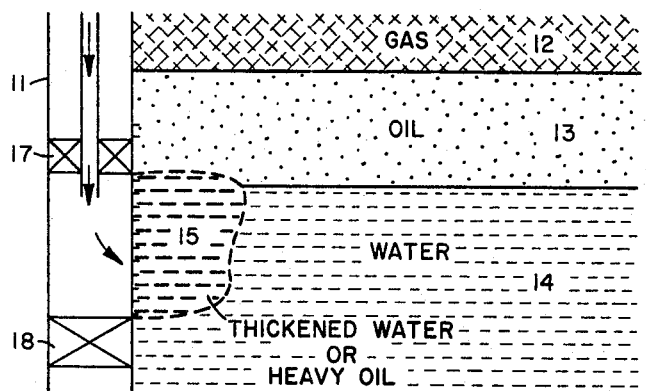
FIGURE 1 represents a cross-section of an oil reservoir overlain by a gas zone and underlain by a water zone, showing the conditions which exist after the first step of the invention.

In FIGURE 1 wellbore 11 penetrates gas-bearing zone 12, oil-bearing zone 13, and water-bearing zone 14. In a multiple phase reservoir such as illustrated, conventional efforts to produce the oil from zone 13 have met with serious difficulties due to the marked tendency of gas from zone 12 to flow downward, and of water from zone 14 to flow upward, resulting in the undesired production of gas and water, with a consequent reduction in the rate of oil production to a level which prevents continued economical operation.

The initial stage of the present invention comprises a selective injection of viscous fluid—for example, thickened water or viscous oil to form a bank of viscous fluid 15 extending radially a distance of at least 10 ft. and up to as much as 100 ft. from the wellbore. The vertical interval of viscous fluid injection extends from near the oil-water contact to a level substantially below the oil-water contact. The thickness of this interval will generally be at least 5 ft. and up to as much as 50 ft. The preferred ratio of bank radius to vertical thickness depends primarily upon the ratio of horizontal to vertical permeability of the reservoir, as explained below.

The viscous fluid may consist, for example, of thickened fresh water or thickened field brine. Any of the various known water-soluble thickening agents may be added to provide a viscosity of 10–300 cps., and preferably from 25–100 cps. Viscosities outside these limits are sometimes operable, but will generally be uneconomic. Suitable water-soluble or water-dispersible thickening agents include sulfonated polystyrene, polyacrylamide, partially hydrolzed polyacrylamide, polyethylene oxide, polypropylene oxide, polysaccharide biopolymers, and others. These water-soluble polymers range in molecular weight from 5,000 to several million and preferably from 50,000 to one million, depending upon the particular polymer chosen for use. Suitable polymer concentrations range from $1/10$ of 1% to as much as 5% by weight, the upper limit generally being one of economics rather than technical feasibility.

Instead of a thickened aqueous medium, the viscous fluid may consist of a heavy oil having a viscosity of 10–300 cps., including for example a viscous crude oil, or fraction thereof, such as a residuum from the distillation of a crude, or a viscous distillate therefrom. If desired, an oil-soluble thickening agent may be added to increase the viscosity of a selected oil fraction. The preferred viscosity is 25–100 cps., similarly as with the injection of a viscous aqueous medium.

Figure 2:
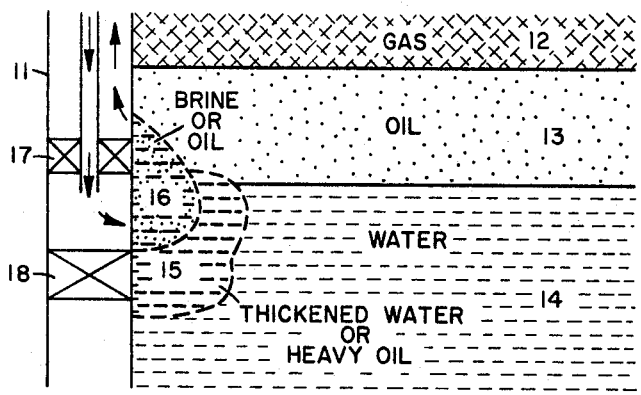
FIGURE 2 represents a cross section of the reservoir showing the conditions which exist after the second stage of the process.

As shown in FIGURE 2, the second stage of the process involves a removal or displacement of the viscous fluid from zone 16. In accordance with one embodiment the viscous fluid is simply displaced outward from the wellbore by the injection of unthickened brine, water, or a low-viscosity oil. Replacement of the viscous fluid with a substantially less viscous fluid may be facilitated, however, by setting packer 17 in the borehole at some intermediate level between the gas-oil contact and the lowermost level from which the viscous fluid is to be removed in order to permit circulation around the packer. For example, by injecting the low-viscosity fluid below the packer while simultaneously backflowing the well just above the packer, region 16 can be readily established without risking the possibility that the low-viscosity fluid may finger through viscous bank 15 before an adequate removal of viscous fluid from the vicinity of the wellbore has occurred.

The low-viscosity fluid selected for sweeping out a portion of the viscous bank is preferably miscible therewith. For example, if the viscous bank is thickened brine, then unthickened brine or water is preferred for the displacement stage of the process. Lease crude is generally suitable for sweeping out a portion of a thick oil bank.

Figure 3:
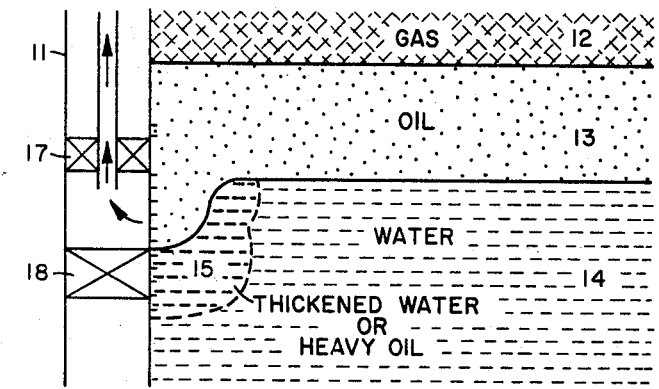
FIGURE 3 is a cross-sectional view of the reservoir showing the conditions which exist during a period of oil production from the reservoir after the injection stages of the process.

In FIGURE 3, the producing stage of the process is shown, whereby production is limited substantially to that interval below the original oil-water contact from which the viscous fluid bank was removed. Once non-viscous fluid bank 16 is produced, the pressure drawdown causes oil from zone 13 to cone downward and be produced through the indicated interval. Concurrent water production at this level is reduced or eliminated by the viscous fluid bank which acts as an immobile barrier to the flow of water.

Over an extended period of time, the continued production of small amounts of the viscous fluid barrier, together with the produced oil, will cause the viscous bank to "shrink" or be dissipated both vertically and horizontally until excessive water breakthrough causes the water-oil ratio to become uneconomic, at which time the method of the invention is repeated. Accordingly, the most economic viscous bank is one which shrinks both radially and vertically to extinction at about the same time.

Therefore, in accordance with a preferred embodiment of the invention, the radial and vertical dimensions of viscous bank 15 are coordinated with the horizontal and vertical permeability of the reservoir in accordance with a mathematical relationship which will subsequently permit radial extinction of the bank to occur substantially concurrently with vertical extinction, as desired. More exactly, it can be shown that concurrent extinction will occur if the dimensions of zone 16 are coordinated with the dimensions of bank 15 such that the following relationship holds:

$$h - h_1 = \sqrt{\frac{(r^2 - r_1^2) \ln \frac{r}{r_1} k_v}{2 k_h}}$$

where:

$r$ = the radius of bank 15
$r_1$ = the radius of zone 16
$h$ = the vertical thickness of zone 15 below the oil-water contact
$h_1$ = the vertical thickness of zone 16 below the oil-water contact
$k_h$ = the horizontal permeability of the reservoir, and
$k_v$ = the vertical permeability of the reservoir.

The invention is further illustrated by application of the method to a reservoir having the following characteristics:

| | |
|---|---|
| Formation thickness _____ft__ | 150 |
| Depth of current producing interval from top of formation _____ft__ | 33–37 |
| Depth of original gas-oil contact from top of formation _____ft__ | 25 |
| Depth of original water-oil contact from top of formation _____ft__ | 43 |
| Average porosity _____percent__ | 23 |
| Average connate water _____percent__PV__ | 37 |
| Average horizontal permeability _____md__ | 90 |
| Average vertical permeability _____md__ | 69 |
| Oil viscosity _____cp__ | 0.34 |
| Gas viscosity _____cp__ | 0.22 |
| Oil density _____g./cc__ | 0.68 |
| Gas density _____g./cc__ | 0.17 |

A heavy oil distillate having a viscosity of about 60 cps. at reservoir temperature is injected into the above-described reservoir at an interval from 43 to 63 ft. below the top of the formation. The oil is injected at a rate of about 100 bbls./day for 6.7 days, totalling 670 bbls., to provide a viscous fluid barrier having a radius of about 20 ft. and a vertical thickness of about 20 ft.

A portion of the heavy oil is then swept from an interval extending from 43 to 55 ft. from the top of the formation, and from a radius of about 10 ft. from the wellbore, leaving a viscous barrier extending radially 10 ft. from the swept zone, and 8 ft. vertically therebelow. Production from the swept zone is then initiated, causing the reservoir oil to cone downward and be produced, with only a minimum amount of water or injected oil entrained therewith.

It is also contemplated that the viscous fluid barrier may include a gelling agent or other substance which sets up or becomes more viscous with time, thereby forming a more permanent barrier. In such an embodiment the step of displacing or removing a portion of the viscous barrier must be completed before substantial gelling has occurred.

Although the method of the invention is applicable to any reservoir wherein the oil zone is underlain by a water-bearing zone, substantially increased benefits are obtained in a reservoir which, in addition to being underlain by a water zone, is overlain by a gas-bearing zone. That is, the method permits a greater vertical distance between the gas-oil contact and the oil-producing interval. It also becomes practical to obtain a given production flow rate with less drawdown, by using a thicker producing interval.

If water-bearing zone 14 is also relatively thin, and is underlain by an impermeable stratum, packer 18 will not be needed. Moreover, it is contemplated in such a reservoir that zone 16 will not require protection against the vertical intrusion of water. Accordingly, in such an embodiment the viscous fluid is injected over the complete vertical interval of the water-bearing zone, and is then displaced or removed from a more limited region having the same vertical thickness.

I claim:

1. A method for producing oil from a well penetrating an oil-bearing formation having a water-producing zone in contact therewith which comprises injecting a bank of a liquid having a viscosity greater than the formation oil in a first region near and below the level of oil-water contact, then selectively replacing a portion of said viscous liquid with a substantially less viscous fluid in a second region surrounding the wellbore near and below the oil-water contact level, the radial and vertical dimensions of said second region being substantially less than the radial and vertical dimensions of said first region, and thereafter producing the well from an interval near and below the original oil-water contact level, said producing interval being limited to a level not substantially below the lowermost level of said second region.

2. A method as defined by claim 1 wherein the viscosity of said viscous liquid is from 25–100 cps. more viscous than the formation oil.

3. A method as defined by claim 2 wherein the viscosity of said less viscous fluid is substantially equal to the viscosity of the formation oil.

4. A method as defined by claim 1 wherein said bank of viscous liquid is injected throughout a vertical interval and for a period of time sufficient to create a bank having radial and vertical dimensions coordinated with the horizontal and vertical permeabilities of the reservoir.

5. A method as defined by claim 1 wherein said production period is followed by a repetition of the injection sequence of claim 1 and a subsequent period of production.

6. A method for producing oil from a well penetrating an oil-bearing formation underlain by a water-producing zone which comprises injecting a bank of a liquid having a viscosity greater than the formation oil into said reservoir throughout a vertical interval extending from a level near the water-oil contact to a substantially lower level, then removing a portion of said viscous liquid from a region surrounding the well-bore extending from the upper level of said viscous liquid bank to a level intermediate the upper and lower levels of said viscous bank, and then producing the well from at least a portion of said interval into which said viscous liquid was injected.

7. A method as defined by claim 6 wherein the dimensions of said viscous bank and the region from which the viscous liquid is removed are coordinated in accordance with the following relationship:

$$h - h_1 = \sqrt{\frac{(r^2 - r_1^2) \ln \frac{r}{r_1} k_v}{2 k_h}}$$

where:
- $r$ = the radius of said viscous liquid bank
- $r_1$ = the radius of the region from which said viscous liquid is removed
- $h$ = the vertical thickness of said viscous liquid bank below the oil-water contact
- $h_1$ = the vertical thickness of the region from which said viscous liquid is removed below the oil-water contact
- $k_h$ = the horizontal permeability of the formation, and
- $k_v$ = the vertical permeability of the formation.

8. A method as defined by claim 6 wherein said portion of the viscous liquid is removed by circulating within the formation a low-viscosity fluid, miscible with said viscous liquid, said low viscosity fluid being circulated between the level near the water-oil contact and the level intermediate the upper and lower levels of viscous bank.

References Cited

UNITED STATES PATENTS

| | | | |
|---|---|---|---|
| 2,607,426 | 8/1952 | Rose | 166—42 |
| 2,784,787 | 3/1957 | Matthews et al. | 166—42 X |
| 2,832,416 | 4/1958 | Allen | 166—42 |
| 2,886,108 | 5/1959 | Piety | 166—42 X |

STEPHEN J. NOVOSAD, *Primary Examiner.*